United States Patent [19]
Johnson

[11] 3,857,980
[45] Dec. 31, 1974

[54] PROCESS FOR PREPARATION AND PRESERVATION OF EGGS

[76] Inventor: Chester A. Johnson, P.O. Box 1437, Turlock, Calif. 95380

[22] Filed: Sept. 17, 1973

[21] Appl. No.: 397,578

[52] U.S. Cl.................. 426/250, 426/211, 426/348, 426/805
[51] Int. Cl............................................. A23b 5/00
[58] Field of Search .......... 426/113, 125, 136, 149, 426/167, 211, 227, 262, 298, 327, 348, 442, 515, 521, 250, 284, 350, 523

[56] References Cited
UNITED STATES PATENTS

| | | | |
|---|---|---|---|
| 2,369,765 | 2/1945 | Waters | 426/411 |
| 3,285,749 | 11/1966 | Shires | 426/515 |
| 3,293,044 | 12/1966 | Torr | 426/250 |
| 3,385,712 | 5/1968 | Dodge et al. | 426/348 |
| 3,594,183 | 7/1971 | Melnick et al. | 426/167 |

*Primary Examiner*—A. Louis Monacell
*Assistant Examiner*—R. A. Yoncoskie
*Attorney, Agent, or Firm*—Clarence A. O'Brien; Harvey B. Jacobson

[57] ABSTRACT

A process for preparing and preserving eggs comprises the steps of centrifugally separating the yolks and whites from the shells and other debris, admixing a dye and optionally a dilute alkali and a silicone with the yolks and whites, placing the admixture into plastic bags and the bags into cooking cans, at least one dimension of the cans permitting complete cooking of the admixture in the center of the can before overcooking the admixture adjacent the periphery of the can, cooking the admixture until the center portion thereof reaches a temperatuure of 145°–160°F, cooling the admixture 90°–100°F and freezing the admixture.

20 Claims, No Drawings

PROCESS FOR PREPARATION AND PRESERVATION OF EGGS

BACKGROUND TO THE INVENTION

1. Field of the Invention

The present invention relates to a process for preparing and preserving eggs and, more particularly, to a process wherein the eggs are cooked under controlled conditions and then preserved by freezing for subsequent use.

2. Description of the Prior Art

The poultry and hatchery industry produces a great many eggs which are inedible or not suitable for human consumption. In the past relatively little use was made of much of this produce, although some of it found its way into pet food to enhance the protein value of the pet food. No attempt was ever made to utilize these eggs as a whole egg product marketable and useful as such for pet foods.

SUMMARY OF THE INVENTION

Accordingly, it is an object of the present invention to provide a process for preparing eggs in such a manner that they are useful as a whole egg pet food.

It is another object of this invention to provide a process whereby otherwise inedible eggs can be cooked and thereafter preserved for subsequent sale and use as a pet food.

It is yet another object of this invention to provide a process which produces a pet food egg product exhibiting a yellow-orange egg color after cooking and which may be thoroughly cooked internally without unsightly discoloration due to overcooking externally.

Other objects and advantages will appear from the following description and appended claims.

Briefly stated, in accordance with the aforesaid objects, the present invention provides a process for preparing and preserving eggs comprising separating the edible egg portions, the yolk and white, from the shell and thereafter admixing the edible egg portions with a heat-stable dye and with alkali and silicone additives which impart a firmness to the finished product. The admixture is placed in plastic bags and cooked in cooking cans which are carefully dimensioned to produce a fully cooked, yet not discolored, egg product. Desirably, cooking is accomplished at temperatures in the range 160°–185°F until the temperature of the egg admixture near the center of the cans is in the range 145°–160°F, whereupon the finished egg product is cooled and frozen for preservation.

DETAILED DESCRIPTION OF THE INVENTION

The present process has as its object the efficient utilization and conversion to a marketable end product of fresh whole chicken and/or turkey eggs which are deemed unsuitable for human consumption, but which are at least of animal feed grade. Eggs of less than animal feed grade or eggs of poor or off odor are not used. The egg shells or other residue are not used in the present process and must be separated from the yolks and whites (edible egg portions) and discarded. Although any well known technique can be used, including hand separation, it has been found efficient and advantageous to employ commercially available centrifugal extractors to effect the separation of the shells. While the separation need not be 100 percent complete, it should be substantially complete with no more than traces of egg shell being carried over and discharged from the extractor with the edible egg portions.

Inasmuch as it is well known that cooking raw eggs alters the color from the characteristic yellow-orange egg color, it is commercially desirable to maintain and restore the recognizable egg color. To this end a dye should be admixed with the edible egg portions. Unfortunately, most suitably colored edible food dyes are not heat stable and break down when exposed to prolonged cooking. However, commercially available beta carotene, 2.4S, yellow or orange coloring has been found suitable in all respects for use in the present process. The coloring will withstand the cooking heat used in the process and maintains its color for at least six months, thereby permitting the finished product to have an extended shelf life. One commercial source of beta carotene is the Hoffman-LaRoche Company. Although the proportion of beta carotene to edible egg portions is by no means critical and depends to some extent on the yellow-orange color intensity desired, it has been found that one pound of beta carotene beadlets for each 750 to 1,800 pounds of liquid edible egg portions is suitable. A ratio of one pound beta carotene beadlets to 990 pounds of liquid egg is particularly preferred.

In addition to the beta carotene it is desirable to include additives in the admixture which impart a firmness to the finished product. Specifically, in the absence of these additives, flaking and/or cheesing of the finished product has been noted. A weak solution of an alkaline additive, such as sodium hydroxide, is one of the desirable firmness enhancing additives. It is preferred to utilize a 1 percent sodium hydroxide solution although solution strengths as high as 5 percent sodium hydroxide are useful. The amount of sodium hydroxide additive used relative to the liquid egg depends primarily upon the strength of the alkaline solution. For example, with a 1 percent solution, one gallon of alkaline solution for each 100 to 175 pounds of liquid egg will produce a useful result with a ratio of one gallon of 1 percent sodium hydroxide to 150 pounds of liquid egg optimum. It will be appreciated that too little alkaline additive produces no observable effect whereas too much alkaline additive is wasteful. The other useful firmness enhancing additive is a silicone product which is essentially an aqueous solution of a dimethyl silicon fluid admixed with a minor amount of a nonionic emulsifying agent. Such a product is commercially available, for example, from Quad Chemical Co. under the designation AF 72 silicone and consists of about 30 percent dimethyl silicone, 69 percent water and 1 percent nonionic emulsifying agent. The dimethyl silicon product useful in this invention has the following typical properties:

| | |
|---|---|
| Silicone solids | 30% |
| Weight (lbs.) per gallon | 8.4 |
| Specific gravity at 25°C | 1.01 |
| Viscosity (cp) at 25°C | 1,000 (max) |
| Color | White |
| Heat stability | Stable to 110°F |
| Dilution stability | Less than 2% creaming and no settling after 24 hrs. at 10% silicone solids |
| Dispersibility | Readily dispersible in warm or cold water with mild agitation |
| Storage stability | No visible settling in 60 days |
| Emulsifier type | Nonionic. |

The quantity of silicon liquid employed depends upon the precise formulation used. However, the quantity is readily determinable inasmuch as one ounce of AF 72 silicone is sufficient for from 500 to 1,500 pounds of liquid egg and appears optimum for about 900 pounds of liquid egg.

The admixture of beta carotene and the liquid edible egg portions, and desirably including the alkaline and silicone additives, is transferred to plastic bags of sufficient strength to contain the admixture and which are able to withstand a temperature range from below freezing up to about 200°F. Such plastic bags are well known and commercially available and, since they form no part of the present invention, will not be discussed in further detail. The quantity of admixture placed in each bag is a matter of choice depending upon the ultimate intended use of the egg product. In one form of the invention about 26 pounds of admixture are placed in each bag. The plastic bags are then placed in cooking cans wherein the admixture is subjected to high temperatures for a time sufficient to thoroughly cook the admixture. The cooking cans also serve as a form to shape the cooked egg product.

In the preferred form of the invention, one plastic bag is placed in each cooking can and the cooking cans are rectangular in shape with the result that the cooked egg product is formed as a rectangular block. For ease of understanding and convenience, the remainder of the description of the present process will be in terms of rectangular cooking cans and a rectangular block product, it being understood, however, that subject to certain limitations which will be discussed more fully hereinafter, the cans and resulting product may assume any configuration.

While, as aforesaid, the cooking cans can assume virtually any configuration, it is essential that at least one dimension of the can be sufficiently small that the heat of cooking can penetrate to the center of the admixture mass within the can in order to sufficiently cook the interior of the block without overcooking the exterior, i.e., the portion adjacent the periphery of the can. It has been found that the beta carotene dye will maintain the food product a desirable yellow-orange color provided that the product is not overcooked. Any portion of the egg product which is over-cooked turns green notwithstanding the presence of the beta carotene. Accordingly, in order to assure adequate heat access to the center of the block, it is necessary that at least one dimension of the rectangular cooking can must be less than about 4 inches. Should the critical dimension become greater than 4 inches, the outside of the block would turn green before the inside of the block is cooked solid (i.e., before it reaches 145°–160°F) irrespective of the amount of coloring added.

The plastic bags containing the admixture are subjected to heat in the cooking cans sufficient to raise the interior temperature of the egg product, i.e., the temperature in the center of the block as measured by thermometers inserted therein, to 145°–160°F. At these temperatures, the admixture in the center of the block is cooked solid. One acceptable means of cooking is to submerge the cooking cans in water having a temperature of 160°–185°F (preferably 160°–165°F). At these cooking temperatures it has been found that about 1–1¼ hours are required to thoroughly cook the egg admixture block. Upon completion of the cooking, the egg product is in hard boiled solid form in the shape of the cooking can (e.g., rectangular).

The plastic bags containing the solid cooked egg product are removed from the cooking cans, placed on freezer racks and frozen by conventional techniques, such as blast freezing. Following freezing, the product may be held in storage awaiting shipment. If desired, prior to freezing, the solid egg product and the cooking cans and associated cooking equipment may be cooled by conventional means, such as a cooling tank, to the range 30°–130°F. Preferably, egg product cooling is accomplished to a temperature in the range 90°–100°F in about 2-3 minutes. It will be appreciated that if the egg product is cooled before freezing, less freezing time is required with attendant economies. In addition, cooling of the cooking cans and associated equipment allows them to be more easily handled and, as a result, they can be more quickly reused to cook additional eggs by the present process.

EXAMPLE

Fresh whole chicken eggs of animal grade or better were placed in a centrifugal extractor and the whites and yolks separated from the shells. The shells were discarded and the whites and yolks admixed with beta carotene beadlets, AF 72 silicone and a 1 percent sodium hydroxide solution. Measured amounts of each additive were thoroughly blended with the yolks and whites (liquid egg) based upon the following proportions:

| | |
|---|---|
| Beta carotene beadlets, 2.4S, from Hoffman-LaRoche | 1 lb./990 lbs. liquid egg |
| 1% sodium hydroxide solution made by dissolving sodium hydroxide pellets in water | 5 gallons/750 lbs. of liquid egg |
| AF 72 silicone from Quad Chemical | 1 oz./900 lbs. of liquid egg. |

The resulting admixture was placed in 16 inches × 28 inches × 0.004 inches clear plastic bags with 26 pounds of admixture in each bag. Each bag was placed in a rectangular ⅛ inch wall galvanized steel cooking can having the dimensions 19½ inches × 12 inches × 3¾ inches. 24 cooking cans were placed in a rack and submerged in a tank of water heated by steam and controlled to a temperature of 160°–165°F. Interior temperatures of the admixture within each can were monitored. When the temperature reached about 130°F, the cans were covered and cooking continued. After about 1¼ hours, the cooking was completed. In all cases the interior temperature of the cooked egg product was in the range 145°–160°F. The product was uniformly bright yellow to orange and had a uniform texture with no separation of egg yellow and whites. The blocks enclosed in their plastic bags were removed from the cooking cans, cooled to 90°F and then blast frozen.

The resulting product diced readily in the frozen or slightly thawed state. It had a minimum protein content of 13.5 percent and a calorie rating of about 672 calories per pound.

While the present invention has been described with reference to particular embodiments thereof, it will be understood that numerous modifications may be made by those skilled in the art without actually departing from the scope of the invention. For example, the wall thickness of the cooking cans and/or the material thereof can be varied in which case the optimum can dimensions as well as the cooking process conditions to prepare a thoroughly cooked yellow-orange product will likewise vary. Accordingly, all modifications and equvalents may be resorted to which fall within the scope of the invention as claimed.

What is claimed as new is as follows:

1. A process for preparing and preserving eggs comprising the steps of:
   a. separating the egg yolks and whites from the egg shells;
   b. mixing beta carotene with the yolks and whites to form a liquid admixture;
   c. mixing said yolks and whites with a 1% to 5% alkaline solution in a ratio of one gallon solution to from 100 to 175 pounds yolks and whites prior to cooking;
   d. placing the admixture in a plastic bag and inserting the bag into a cooking container;
   e. cooking the admixture at a temperature in the range 160°–185°F for a time sufficient to raise the internal temperature of the admixture to the range 145°–160°F before the portion of the admixture adjacent the periphery of said container becomes overcooked; and
   f. freezing the cooked admixture.

2. A process, as claimed in claim 1, further including removing said plastic bag from said cooking container after cooking and prior to freezing.

3. A process, as claimed in claim 1, wherein said alkaline solution is sodium hydroxide.

4. A process, as claimed in claim 3, wherein said alkaline solution is 1 percent sodium hydroxide and said ratio is one gallon solution to 150 pounds yolks and whites.

5. A process for preparing and preserving eggs comprising the steps of:
   a. separating the egg yolks and whites from the egg shells;
   b. mixing beta carotene with the yolks and whites to form a liquid mixture;
   c. mixing said yolks and whites with an aqueous dimethyl silicone liquid in a ratio of one ounce of silicone liquid to from 500 to 1,500 pounds of yolks and whites;
   d. placing the admixture in a plastic bag and inserting the bag into a cooking container;
   e. cooking the admixture at a temperature in the range 160°–185°F for a time sufficient to raise the internal temperature of the admixture to the range 145°–160°F before the portion of the admixture adjacent the periphery of said container becomes overcooked; and
   f. freezing the cooked admixture.

6. A process, as claimed in claim 5, wherein said ratio is one ounce of dimethyl silicone liquid to 900 pounds of yolks and whites.

7. A process, as claimed in claim 6, wherein said dimethyl silicone liquid further includes a nonionic emulsifying agent therein.

8. A process, as claimed in claim 1, wherein the ratio of beta carotene to yolks and whites is 1 pound of beta carotene to from 750 to 1,800 pounds of yolks and whites.

9. A process, as claimed in claim 8, wherein the ratio of beta carotene to yolks and whites is one pound of beta carotene to about 990 pounds of yolks and whites.

10. A process, as claimed in claim 2, wherein the admixture assumes the physical configuration of the cooking container.

11. A process, as claimed in claim 10, wherein the cooking container is rectangular in cross-section.

12. A process, as claimed in claim 10, wherein the cooking container includes at least one dimension sufficiently small to permit the interior temperature of said admixture to reach 145°–160°F before the portion of said admixture adjacent the periphery of said container becomes overcooked.

13. A process, as claimed in claim 12, wherein said container is substantially rectangular in cross-section and at least one dimension thereof is four inches or less.

14. A process, as claimed in claim 1, wherein said yolks and whites are mixed with said beta carotene in the ratio of one pound of beta carotene to from 750 to 1,800 pounds of yolks and whites and with an aqueous dimethyl silicone liquid in a ratio of one ounce of liquid to from 500 to 1,500 pounds of yolks and whites.

15. A process, as claimed in claim 14, wherein said beta carotene ratio is one pound of beta carotene to about 990 pounds of yolks and whites, said alkaline solution is 1 percent sodium hydroxide and said sodium hydroxide solution ratio is one gallon solution to 150 pounds yolks and whites and said silicone liquid ratio is one ounce of liquid to 900 pounds of yolks and whites.

16. A process, as claimed in claim 15, further including the step of cooling said cooked admixture to the temperature range 90°–100°F prior to freezing.

17. A process, as claimed in claim 3, further including removing said plastic bag from said cooking container after cooking and prior to freezing.

18. A process, as claimed in claim 5, further including removing said plastic bag from said cooking container after cooking and prior to freezing.

19. A process, as claimed in claim 14, wherein cooking is accomplished by contacting said container with water having a temperature of 160°–185°F.

20. A process, as claimed in claim 14, wherein the cooking container includes at least one dimension sufficiently small to permit the interior temperature of said admixture to reach 145°–160°F before the portion of said admixture adjacent the periphery of said container becomes overcooked.

* * * * *